United States Patent [19]
Gentile et al.

[11] Patent Number: 5,342,083
[45] Date of Patent: Aug. 30, 1994

[54] VEHICLE OCCUPANT RESTRAINT APPARATUS

[75] Inventors: David P. Gentile, Fraser; Jeffrey C. Synor, Utica; Chien H. Lee, Rochester Hills, all of Mich.

[73] Assignee: TRW Vehicle Safety Systems Inc., Lyndhurst, Ohio

[21] Appl. No.: 74,799

[22] Filed: Jun. 10, 1993

[51] Int. Cl.$^5$ ............................................. B60R 21/16
[52] U.S. Cl. ............................... 280/728 A; 220/326; 280/728 R; 280/728 B; 280/732
[58] Field of Search ............ 280/728 R, 728 A, 728 B, 280/731, 732; 220/326, 261

[56] References Cited

U.S. PATENT DOCUMENTS

| | | |
|---|---|---|
| 3,622,176 | 11/1971 | Byer . |
| 4,773,673 | 9/1988 | Sakurai . |
| 4,817,828 | 4/1989 | Goetz . |
| 4,893,833 | 1/1990 | DiSalvo et al. . |
| 4,973,081 | 11/1990 | Rafferty ........................ 280/728 B |
| 5,066,037 | 11/1991 | Castrigno et al. ................ 280/732 |
| 5,219,177 | 6/1993 | Wang ............................ 280/728 B |

FOREIGN PATENT DOCUMENTS 896312 11/1953 Fed. Rep. of Germany .
2246983 2/1992 United Kingdom ............ 280/728 B

*Primary Examiner*—Eric Culbreth
*Attorney, Agent, or Firm*—Tarolli, Sundheim & Covell

[57] ABSTRACT

A vehicle occupant restraint apparatus (10) includes an inflatable air bag (18) and a housing (16) in which the air bag (18) is stored in a folded condition. The housing (16) has a movable panel (82) with a slot (90). The apparatus further includes a door (104) with a tab (110). The door (104) has a closed position in which it blocks movement of the air bag (18) outward from the housing (16). When the door (104) is in the closed position, the tab (110) on the door (104) is received in the slot (90) in the movable panel (82). The tab (110) and the slot (90) thus establish a mechanical interlock which secures the door (104) in the closed position. When the air bag (18) is inflated, it moves against the movable panel (82) and moves the movable panel (82) relative to the door (104). The mechanical interlock between the door (104) and the housing (16) is then released by the inflating air bag (18). The door (104) is thus released for movement from the closed position by the inflating air bag (18).

11 Claims, 2 Drawing Sheets

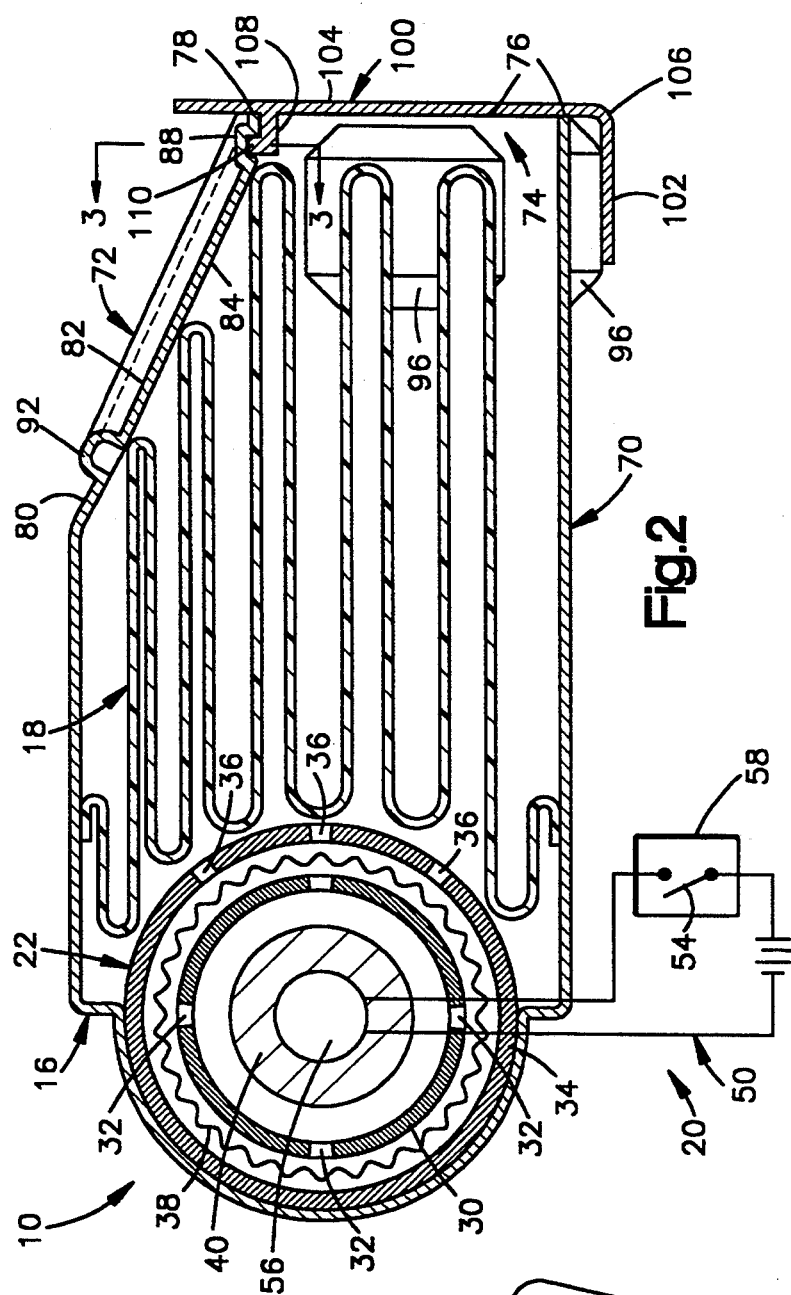
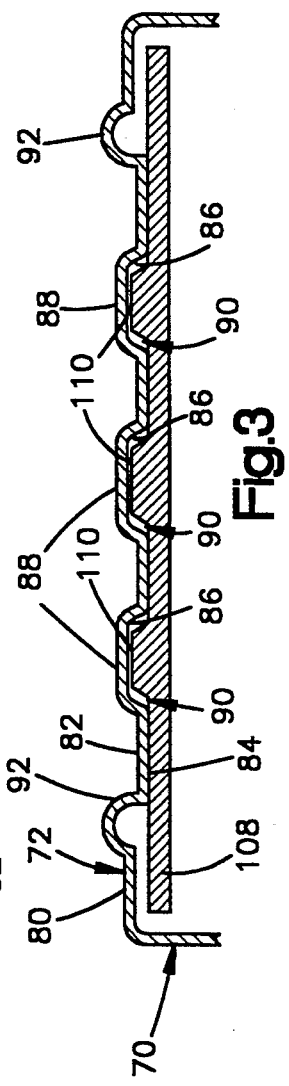
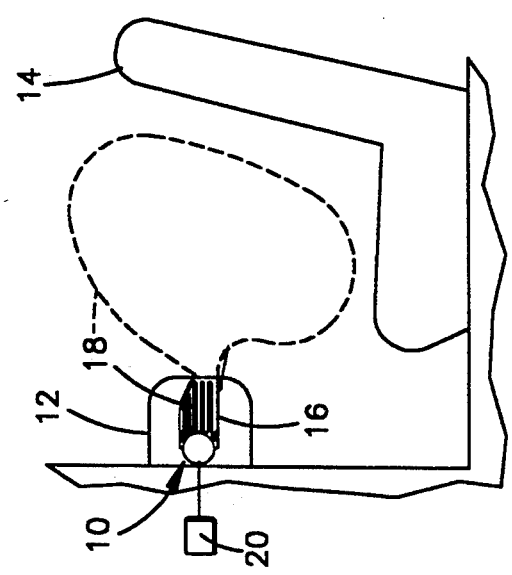

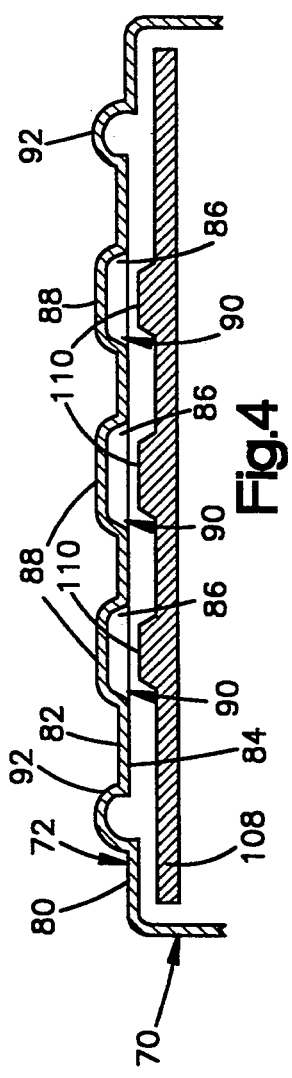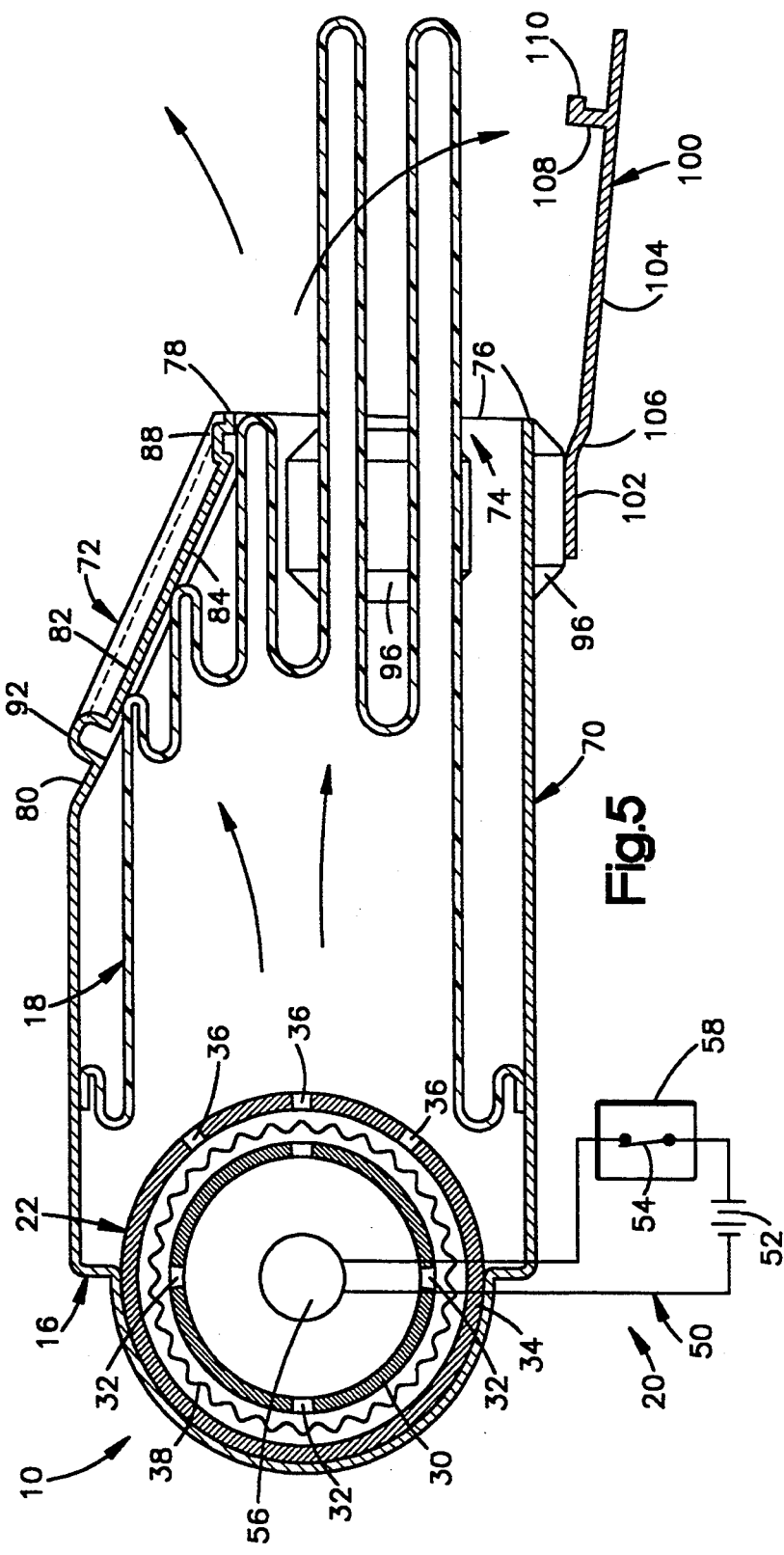

VEHICLE OCCUPANT RESTRAINT APPARATUS

FIELD OF THE INVENTION

The present invention relates to a vehicle occupant restraint apparatus including an inflatable air bag.

BACKGROUND OF THE INVENTION

U.S. Pat. No. 4,773,673 discloses a vehicle occupant restraint apparatus including an inflatable air bag and a source of gas for inflating the air bag. The air bag is stored in a folded condition within a container. The container has a door with a hinge, and is supported in a position in which the door faces a seat in the vehicle occupant compartment.

When the air bag is being inflated by the gas, it expands from its folded condition. The air bag then moves against the inside of the container door and pushes the door outwardly about the hinge. The air bag thus opens the door as the air bag is being expanded by the gas. The air bag continues to expand outwardly past the door and into the vehicle occupant compartment until it reaches a fully inflated condition.

The vehicle occupant restraint apparatus disclosed in the '673 patent further includes a latching unit which secures the door in a closed position until the air bag is to be inflated. The latching unit includes a pivotal latching lever which is supported on the inside of the door. The latching lever has an engaged position in which it engages the adjoining edge of the container to block movement of the door out of the closed position. The latching unit further includes a pressure cylinder which communicates with the source of gas. The pressure cylinder has a piston rod which moves in response to gas pressure in the pressure cylinder. When the air bag is to be inflated, a quantity of the gas is directed from the source to the pressure cylinder. The piston rod then moves in response to the increased gas pressure in the pressure cylinder, and moves against the latching lever to move the latching lever pivotally out of the engaged position. The latching unit thus releases the door for movement out of the closed position when the air bag is to be inflated.

U.S. Pat. No. 4,893,833 also discloses a vehicle occupant restraint apparatus including an inflatable air bag and a source of gas for inflating the air bag. The restraint apparatus disclosed in the '833 patent also has a door which is moved pivotally from a closed position to an open position by the air bag as the air bag expands toward its fully inflated condition. When the door is in the closed position, a frangible tab portion of the door extends into a recess in the vehicle instrument panel. The tab portion of the door and the recess in the instrumental panel establish a mechanical interlock which secures the door in the closed position. When the gas begins to inflate the air bag, the air bag expands and moves forcefully against the inside of the door. The energy of the expanding air bag that is directed against the door causes the tab portion of the door to be sheared away from the door. The restraint apparatus thus releases the door for movement out of the closed position by directing the energy of the expanding air bag against the door to break the tab portion of the door.

SUMMARY OF THE INVENTION

In accordance with the present invention, a vehicle occupant restraint apparatus includes a housing, an inflatable air bag and an inflating means. The housing has a deployment opening, a movable part, and means defining a first locking surface which moves with the movable part. The air bag has a stored condition in which it is contained within the housing. The bag also has an inflated condition in which it extends outward through the deployment opening in the housing. The inflating means includes a source of inflation fluid for inflating the air bag from the stored condition to the inflated condition. The inflating means expands the air bag, and thus moves the air bag against the movable part of the housing to move the movable part of the housing when the air bag is inflating.

The vehicle occupant restraint apparatus further includes a door. The door has a closed position in which it extends across the deployment opening in the housing. The door also has an open position in which it does not extend across the deployment opening. The door has means defining a second locking surface for engaging the first locking surface on the movable part of the housing when the door is in the closed position. The first and second locking surfaces establish a mechanical interlock between the door and the housing when the second locking surface is engaged with the first locking surface. The mechanical interlock secures the door in the closed position, and is releasable to release the door for movement out of the closed position. The first locking surface on the movable part of the housing moves out of engagement with the second locking surface on the door to release the mechanical interlock upon movement of the movable part by the expanding air bag.

In a preferred embodiment of the present invention, the movable part of the housing is a movable wall panel. The first locking surface comprises a plurality of recessed locking surfaces, each of which defines a slot in the movable wall panel. The second locking surface on the door comprises a plurality of projecting locking surfaces, each of which defines a tab on the door. When the door is in the closed position, each of the tabs on the door is closely received within a respective one of the slots in the movable wall panel. The tabs and the slots establish the releasable mechanical interlock which secures the door in the closed position. When the gas begins to inflate the air bag, the air bag begins to expand from the folded condition and moves forcefully against the movable wall panel. The expanding air bag then moves the movable wall panel relative to the door. The expanding air bag thus moves the recessed locking surfaces away from the tabs so that the tabs are released from the slots. The mechanical interlock is thus released by the air bag as the air bag begins to expand from the folded condition.

The vehicle occupant restraint apparatus constructed in accordance with the present invention enables the mechanically locked door to be released for movement from the closed position by the energy of the expanding air bag without requiring the energy of the expanding air bag to break the door. The operation of the apparatus therefore does not rely on an unlocking mechanism separate from the air bag itself, and also does not rely on material properties of the door which otherwise would be required to enable the door to break.

BRIEF DESCRIPTION OF THE DRAWINGS

The foregoing and other features of the present invention will become apparent to those skilled in the art to which the present invention relates from reading the following description with reference to the accompanying drawings, in which:

FIG. 1 is a schematic view of a vehicle occupant restraint apparatus constructed in accordance with the present invention and installed in a vehicle;

FIG. 2 is an enlarged schematic view showing the vehicle occupant restraint apparatus of FIG. 1 in greater detail;

FIG. 3 is a view taken on line 3—3 of FIG. 2;

FIG. 4 is a view of the parts shown in FIG. 3 in different positions; and

FIG. 5 is a view showing the apparatus of FIG. 2 in an actuated condition.

DESCRIPTION OF A PREFERRED EMBODIMENT

A vehicle occupant restraint apparatus 10 constructed in accordance with the present invention is shown schematically in FIG. 1. The restraint apparatus 10 is mounted in a vehicle instrument panel 12 in a position facing a vehicle seat 14. The restraint apparatus 10 includes a housing 16 and an inflatable air bag 18. The air bag 18 has a stored condition in which it is folded and contained within the housing 16, as shown in solid lines in FIG. 1. The air bag 18 also has an inflated condition in which it extends outward from the housing 16 and into the vehicle occupant compartment between the instrument panel 12 and the seat 14, as shown in dashed lines in FIG. 1. The restraint apparatus 10 also includes an actuating assembly 20 which actuates the restraint apparatus 10 upon the occurrence of a vehicle collision. When the restraint apparatus 10 is actuated by the actuating assembly 20, the air bag 18 is inflated from the stored condition to the inflated condition to restrain movement of an occupant of the seat 14.

As shown in greater detail in FIG. 2, the housing 16 also contains an inflator 22. The inflator 22 includes a source of fluid, preferably a gas, for inflating the air bag. More particularly, the inflator 22 has a cylindrical tube 30 with a plurality of gas flow openings 32, and has a cylindrical outer wall 34 with a plurality of gas flow openings 36. A cylindrical filter 38 is located between the tube 30 and the outer wall 34. A body 40 of ignitable gas generating material is contained within the tube 30. The body 40 of ignitable gas generating material, when burning, rapidly generates a large quantity of gas. The gas generated by the body 40 is directed radially outward to the air bag 18 through the gas flow openings 32, the filter 38, and the gas flow openings 36. Although many known types of gas generating material could be used for the body 40, especially suitable gas generating materials are disclosed in U.S. Pat. No. 4,817,828. Although the source of inflation fluid is disclosed as an ignitable gas generating material, it could comprise a quantity of stored gas either alone or in combination with ignitable gas generating material.

The actuating assembly 20 also is shown in greater detail in FIG. 2. The actuating assembly 20 preferably comprises an electrical circuit 50 which includes a power source 52, a normally open switch 54, and an igniter 56. The power source 52 is preferably the vehicle battery and/or a capacitor. The switch 54 is preferably part of a vehicle deceleration sensor 58. The vehicle deceleration sensor 58 senses vehicle deceleration which is indicative of a collision, and closes the switch 54 in response to such vehicle deceleration. Such a vehicle deceleration sensor is known in the art. The igniter 56 is associated with the body 40 of ignitable gas generating material in the inflator 22 to ignite the body 40 upon the passage of electric current through the igniter 56. Such an igniter also is known in the art.

When the vehicle experiences a collision, the deceleration sensor 58 senses the deceleration of the vehicle that is caused by the collision and closes the switch 54. When the switch 54 is closed, electric current passes through the igniter 56. The igniter 56 then ignites the body 40 of ignitable gas generating material. The gas generated by the burning body 40 is directed into the air bag 18 as described above. The air bag 18 is thus inflated from the folded condition to the inflated condition upon the occurrence of a vehicle collision.

As further shown in FIG. 2, the housing 16 has a main body portion 70 and an inclined upper wall 72. The housing 16 also has a deployment opening 74 with a rectangular shape. The main body portion 70 of the housing 16 has a forward edge surface 76 which extends around three sides of the deployment opening 74. The inclined upper wall 72 of the housing 16 has a forward edge surface 78 which extends across the fourth, upper side of the deployment opening 74.

The inclined upper wall 72 of the housing 16 includes a peripheral base 80 and a movable panel 82. The movable panel 82 has a major inner surface 84 facing the air bag 18 within the housing 16. As best shown in FIGS. 3 and 4, the movable panel 82 also has a plurality of minor inner surfaces 86. Each of the minor inner surfaces 86 is located within a respective raised part 88 of the movable panel 82, and defines a respective slot 90. An expansion joint portion 92 of the inclined upper wall 72 joins the movable panel 82 with the peripheral base 80. The expansion Joint portion 92 has an arcuate cross-sectional shape which enables it to flex between the movable panel 82 and the peripheral base 80. The expansion joint portion 92 thus enables the movable panel 82 to move upward relative to the peripheral base 80 upon flexing of the expansion joint portion 92. Specifically, the movable panel 82 is thus movable upward from the position shown in FIGS. 2 and 3 to the position shown in FIGS. 4 and 5.

The inclined upper wall 72 of the housing 16 is formed of a flexible material, such as a light gauge sheet metal, to enable the expansion Joint portion 92 to flex as described above. In the preferred embodiment shown in the drawings, both the inclined upper wall 72 and the main body portion 70 of the housing 16 are formed of light gauge aluminum sheet metal. The main body portion 70 has raised rib sections 96 which reinforce the main body portion 70 to hold it from flexing out of shape.

The restraint apparatus 10 further includes a closure member 100, which also is preferably formed of a light gauge sheet metal. The closure member 100 has a lower portion defining a base 102, and upper portion defining a door 104, and an intermediate portion 106 defining a bendable hinge between the base 102 and the door 104. The base 102 of the closure member 100 is fixed, such as by welding or with suitable fasteners, to the underside of the main body portion 70 of the housing 16. The door 104 is movable pivotally about the intermediate portion 106 upon bending of the intermediate portion 106. The door 104 is thus movable pivotally away from the deployment opening 74 in the housing 16 from the closed position shown in FIG. 2 to the open position shown in FIG. 5.

The door 104 has a ledge 108. The ledge 108 has a plurality of upwardly extending tabs 110 which are spaced from each other along the length of the ledge 108. When the door 104 is in the closed position, as shown in FIG. 2, the ledge 108 extends inward through the deployment opening 74 in the housing 16 and horizontally across the upper side of the deployment opening 74. Each of the tabs 110 is closely received in a respective one of the slots 90 in the raised parts 88 of the movable panel 82. The tabs 110 on the door 104 and the raised parts 88 of the movable panel 82 thus establish a mechanical interlock between the door 104 and the housing 16. The mechanical interlock secures the door 104 in the closed position.

When the vehicle occupant restraint apparatus 10 is actuated, the gas flowing into the air bag 18 begins to expand the air bag 18 and pushes it against the major inner surface 84 of the movable panel 82. The inclined upper wall 72 of the housing 16 is inclined into the path of movement of the expanding air bag 18 so that the expanding air bag 18 moves against the major inner surface 84 forcefully enough to move the movable panel 82 upward relative to the peripheral base 80. The expanding air bag 18 thus moves the movable panel 82 from the position shown in FIG. 2 to the position shown in FIG. 5. As shown specifically in FIGS. 3 and 4, the raised parts 88 of the movable panel 82 are then lifted off of the tabs 110 on the door 104 so that the tabs 110 are released from the slots 90. The mechanical interlock previously established by the tabs 110 and the raised parts 88 is thus released upon movement of the movable panel 82 under the influence of the expanding air bag 18.

After releasing the mechanical interlock between the door 104 and housing 16, the expanding air bag 18 moves outwardly through the deployment opening 74 and against the door 104 to move the door 104 into the fully opened position shown in FIG. 5. The expanding air bag 18 continues to move outward through the deployment opening 74 and past the opened door 104 as it expands toward the inflated position shown in FIG. 1.

From the above description of the invention, those skilled in the art will perceive improvements, changes and modifications. Such improvements, changes and modifications within the skill of the art are intended to be covered by the appended claims.

Having described the invention, the following is claimed:

1. Apparatus comprising:
a housing having a deployment opening, a movable part, and means for defining a first locking surface which moves with said movable part;
an inflatable air bag having a stored condition in which said air bag is contained within said housing, said air bag having an inflated condition in which said air bag extends outward through said deployment opening;
inflating means including a source of fluid for inflating said air bag from said stored condition to said inflated condition, said inflating means expanding said air bag and moving said air bag into contact with and forcefully against said movable part of said housing to move said movable part of said housing when said air bag is inflating; and
a door having a closed position in which said door extends across said deployment opening and an open position in which said door does not extend across said deployment opening;
said door having means for defining a second locking surface that engages said first locking surface when said door is in said closed position, said first and second locking surfaces establishing a mechanical interlock between said door and said housing when said second locking surface is engaged with said first locking surface, said mechanical interlock securing said door in said closed position and being releasable to release said door for movement from said closed position, said first locking surface being moved out of engagement with said second locking surface to release said mechanical interlock upon movement of said movable part of said housing by said air bag.

2. Apparatus as defined in claim 1 wherein said movable part of said housing comprises a movable wall panel which partly defines a compartment in which said air bag is contained in said housing.

3. Apparatus as defined in claim 2 wherein said housing further has a base wall portion and means for defining an expansion joint, said base wall portion being fixed relative to said door when said door is in said closed position, said expansion joint joining said movable wall panel to said base wall portion and enabling displacement of said movable wall panel from said base wall portion upon expansion of said expansion joint.

4. Apparatus as defined in claim 3 wherein said expansion joint comprises a flexible wall portion of said housing extending between said movable wall panel and said base wall portion, said flexible wall portion being flexible between said movable wall panel and said base wall portion to enable said displacement of said movable wall panel from said base wall portion.

5. Apparatus as defined in claim 4 wherein said first locking surface comprises a plurality of recessed surface portions of said movable wall panel, each of which defines a respective slot, said second locking surface comprising a plurality of projecting surface portions of said door, each of which defines a respective tab, said tabs extending into said slots and blocking movement of said movable wall panel relative to said door when said second locking surface is engaged with said first locking surface to establish said mechanical interlock.

6. Apparatus as defined in claim 1 wherein said movable part of said housing has an edge surface which partly defines said deployment opening.

7. Apparatus as defined in claim 1 wherein said housing includes wall means for defining a compartment in which said air bag is contained in said housing, said wall means including a movable wall panel which partly defines said compartment, said movable part of said housing comprising said movable wall panel.

8. Apparatus as defined in claim 7 wherein said movable wall panel has an inner surface facing said air bag in said compartment, said inflating means moving said air bag into contact with and forcefully against said inner surface to move said movable part of said housing when said air bag is inflating.

9. Apparatus as defined in claim 8 wherein said movable wall panel has an edge surface which partly defines said deployment opening.

10. Apparatus as defined in claim 9 wherein said deployment opening has a rectangular shape, said edge surface of said movable wall panel having opposite ends at one side of said deployment opening, said wall means further defining a flexible joint extending around the periphery of said movable wall panel between said opposite ends of said edge surface, said flexible joint enabling said movable wall panel to be moved by said air bag when said air bag moves into contact with and forcefully against said inner surface of said movable wall panel.

11. Apparatus comprising:

a housing having a deployment opening, a movable part, and means for defining a first locking surface which moves with said movable part;

an inflatable air bag having a stored condition in which said air bag is contained within said housing, said air bag having an inflated condition in which said air bag extends outward through said deployment opening;

inflating means including a source of fluid for inflating said air bag from said stored condition to said inflated condition, said inflating means expanding said air bag and moving said air bag against said movable part of said housing to move said movable part of said housing when said air bag is inflating; and a door having a closed position in which said door extends across said deployment opening and an open position in which said door does not extend across said deployment opening;

said door having means for defining a second locking surface that engages said first locking surface when said door is in said closed position, said first and second locking surfaces establishing a mechanical interlock between said door and said housing when said second locking surface is engaged with said first locking surface, said mechanical interlock securing said door in said closed position and being releasable to release said door for movement from said closed position, said first locking surface being moved out of engagement with said second locking surface to release said mechanical interlock upon movement of said movable part of said housing by said air bag;

said movable part of said housing comprising a movable wall panel which is inclined into the path of movement of said air bag.

* * * * *